United States Patent [19]

Yamano et al.

[11] Patent Number: 4,600,096
[45] Date of Patent: Jul. 15, 1986

[54] DISPERSION FEEDER

[75] Inventors: Shoji Yamano, Akashi; Yoshitaka Mikata, Himeji; Tadashi Higuchi, Akashi; Kazuhiro Nishide, Kobe, all of Japan

[73] Assignee: Yamato Scale Company, Limited, Japan

[21] Appl. No.: 648,589

[22] Filed: Sep. 10, 1984

[30] Foreign Application Priority Data

Jan. 19, 1984 [JP] Japan .................................... 59-8180

[51] Int. Cl.$^4$ ...................... B65G 47/72; B65G 27/00; G01G 13/08
[52] U.S. Cl. ...................................... 198/505; 177/58; 177/DIG. 11; 198/601; 198/771
[58] Field of Search ................ 198/601, 609, 775, 758, 198/771, 443, 505, 533, 504; 177/58, 54, 25, DIG. 11; 209/592; 222/63, 196, 330, 56, 409

[56] References Cited

U.S. PATENT DOCUMENTS

| | | | |
|---|---|---|---|
| 3,339,651 | 9/1967 | Garnett | 177/58 |
| 4,398,612 | 8/1983 | Mikami et al. | 177/25 |
| 4,418,771 | 12/1983 | Henry et al. | 222/330 |
| 4,454,924 | 6/1984 | Minamida | 177/25 |
| 4,516,644 | 5/1985 | Fukuda | 177/25 |

Primary Examiner—Joseph E. Valenza
Assistant Examiner—Daniel R. Alexander
Attorney, Agent, or Firm—Senniger, Powers, Leavitt and Roedel

[57] ABSTRACT

A dispersion feeder for distributively feeding product to a plurality of weighing units arranged circularly about a common axis, comprising a plurality of conveyer troughs arranged radially about the axis for communicating by their outer ends respectively with the weighing units, and a plurality of vibrating units attached respectively to the conveyer troughs for subjecting each conveyer trough to independent vibration. Each conveyer trough is provided with a projection inclined upwardly and radially inwardly toward the common axis. These projections are arranged radially about the axis without mutual contact to form a conical or domed substantially continuous central dispersion surface, and each projection and its corresponding conveyor trough is adapted to be subjected to independent vibration to feed product supplied directly onto the dispersion surface to the corresponding conveyer trough.

2 Claims, 3 Drawing Figures

DISPERSION FEEDER

BACKGROUND OF THE INVENTION

This invention relates to a dispersion feeder which is especially useful for automatically feeding product or articles to an automatic combination weighing machine of circular array type.

As disclosed, for example, in the opened Japanese patent specification No. 57-160021, the automatic combination weighing machine of circular array type has a plurality of weighing units arranged on a circumference at equal intervals and serves to selectively combine the weights of articles weighed simultaneously by the respective weighing units to obtain a total weight satisfying a predetermined condition. The dispersion feeder is located in the center of the circular array of the weighing units in order to disperse the articles fed to its central portion in the radial direction and supply them to weighing hoppers or preceding holding hoppers of the respective weighing units.

As described in the above Japanese opened specification, the dispersion feeder according to the prior art includes a generally conical or disc or dome-shaped central distributing member located in the center and a plurality of linear conveying troughs extending radially from the periphery of the central member to the respective weighing units. The central member is generally subjected to helical vibration by a vibrator attached to its bottom to uniformly distribute the articles fed by suitable means to its central portion successively toward its periphery. Each linear conveying trough is also subjected to linear slanting vibration by an individual vibrator attached thereto to convey the articles fed from the central distributing member to each corresponding weighing unit. Each weighing unit is unloaded automatically, when the weight of its content has participated in the above total weight of predetermined condition, that is, in an acceptable combination. In response to this unloading, the vibrator of the conveying through corresponding to this weighing unit is actuated for a preselected time to load said weighing unit with a substantially constant amount of articles.

As described above, each linear conveyer trough operates only for a predetermined time if the corresponding weighing unit has been unloaded, and otherwise is stopped, while the central distributing member operates always or along with each conveyor trough to shift the articles out of the periphery. Accordingly, the articles on the resting conveyer troughs may be pushed forward to result in excessive loading of the corresponding weighing units. Moreover, the articles may be supplied excessively onto the resting troughs to result in an increased thickness of the layer of articles which can cause excessive loading.

In the combination weighing machine, the amplitude of vibration of the central distributing member and the amplitude and duration of vibration of the conveyer troughs are previously adjusted so that an optimum amount of articles are supplied to each weighing unit in order to minimize the deviation of the resultant combined weight from the predetermined condition, that is, to improve the weigh-out accuracy. Therefore, such accidental excessive loading might reduce the weigh-out accuracy and has been a severe problem in the prior art.

SUMMARY OF THE INVENTION

Accordingly, an object of this invention is to provide a dispersion feeder which can prevent occurrence of such unpredictable and unwanted excessive loading.

In accordance with this invention, a dispersion feeder comprises a plurality of members, each having a generally sectorial planar shape, arranged radially to form a generally circular planar shape, and vibrating means associated with each member to vibrate it individually.

The above and other features and effects of this invention will be described in detail hereinunder with reference to the accompanying drawings.

BRIEF DESCRIPTION OF THE DRAWINGS

In the drawings.

Throughout the drawings, the same reference numerals are given to corresponding structural components.

DESCRIPTION OF THE PREFERRED EMBODIMENT

Figure 1:
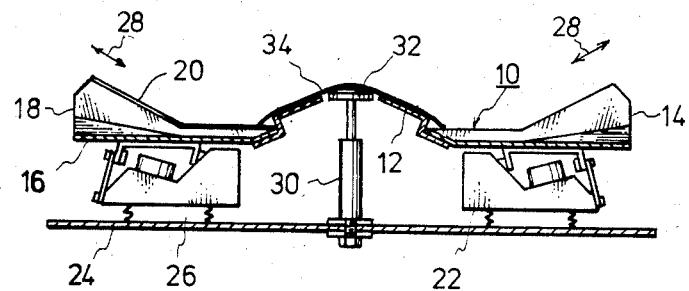
FIG. 1 is a simplified vertical sectional view of an embodiment of the dispersion feeder according to this invention.
Figure 2:
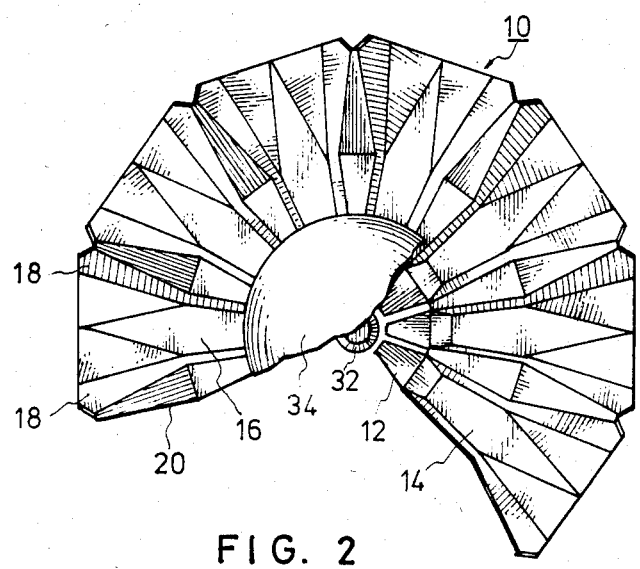
FIG. 2 is a partially broken-away plan view of the dispersion feeder of FIG. 1.

Referring to FIGS. 1 and 2, the dispersion feeder includes a plurality of distributing members 10 each having the general shape of a sector or isosceles triangle arranged radially about a common axis. Each distributing member 10 is composed of a projection or head portion 12 which is substantially flat and slanting upwards and radially inwardly towards the vertex, and a trough-like body portion 14 having a substantially horizontal bottom 16 and a pair of formed side walls 18. The head portion 12 and the body portion 14 may be made by press-forming stainless steel sheets, for example, and bonding them by welding, soldering or rivetting. Alternatively, both portions 12 and 14 may be formed integrally.

Each distributing member 10 is fixed to a vibrating member of a vibrator 22 which is, in turn, mounted on a base plate 24 through a vibration absorbing material 26, such as rubber. The vibration absorbing material 26 serves to prevent vibration of the vibrator 22 thereon from acting on the other distributing members 10. The vibrator 22 may be of the type similar to that which is described in the aforementioned opened patent specification, for example, and provides the distributing member 10 with slanting vibration in the direction of arrow 28.

The distributing members 10, in combination with their vibrators 22, are arranged radially, as shown in FIG. 2, to form a generally circular or polygonal planar pattern. In order to close up a gap formed otherwise in this case between each adjoining pair of distributing members 10, one of the side walls 18 of each member 10 extends generally transversely to a vertical plane to form a generally horizontal eaves-like portion 20. The portion 20 is designed to completely close up the gap between the adjoining members 10 but not to touch the other member at all. A central opening formed at the vertices of the members 10 is closed up by a small disc 32 supported over the base plate 24 by a post 30. The head portions 12 of the members 10 are separated mutually by small gaps and are also separated from the disc 32.

In this structure, the head portions 12 of the distributing members 10 and the disc 32 together from a generally conical or domed substantially continuous central dispersion surface covered by an adaptive cover 34. The cover 34 is preferably made of a plastic sheet, such as rubber or synthetic resin, which is thin enough to prevent transmission of vibration therethrough to adjoining distributing members 10. The cover 34 serves to prevent the handled articles from falling in the gaps between the head portions 12 and the small disc 32 and, therefore, can be omitted when there should be no such danger.

Figure 3:
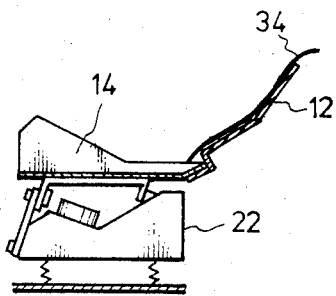
FIG. 3 is a simplified vertical sectional view of a part of another embodiment of the dispersion feeder of this invention.

The small disc 32 may be omitted by designing the head portion 12 of each distributing member 10 as a triangle instead of trapezoid as shown. The post 30 may be substituted with another vibrator (not shown) to vibrate the disc 32 in order to prevent retardation of the articles. The head portion 12 of each member 10 may be made horizontal as occasion demands, or may be made more abrupt or folded as shown in FIG. 3. The head portion 12 and the body portion 14 of each member 10 may be separated and driven respectively by separate vibrators.

In operation, the articles to be weighed are fed onto the central portion of the dispersion feeder structure (FIGS. 1 and 2) by suitable means such as a chute or belt conveyer (not shown). Each distributing member 10, the head portion 12 of which constitutes a segment of the central dispersion surface, is independently vibrated by its vibrator 22, when the corresponding weighing or holding hopper (not shown) has been unloaded, to feed the articles carried by said member 10 to said hopper.

Since each member 10 is separated individually from the other members 10 from the mechanical viewpoint, it is never affected by other vibrating members. Moreover, the aforementioned unwanted feeding and resultant excessive loading should not take place since there is no common vibrating portion such as has been used generally in the prior art devices. Although some articles may fall down from the adjoining members 10, the amount is too little to cause abnormal loading.

We claim:

1. A dispersion feeder for distributively feeding product to a plurality of weighing units arranged circularly about a common axis, comprising a plurality of conveyer troughs arranged radially about said axis for communicating by their outer ends respectively with said weighing units, and a plurality of vibrating units attached respectively to said conveyer troughs for subjecting each conveyer trough to independent vibration; wherein each said conveyer trough is provided with a projection inclined upwardly and radially inwardly toward said common axis, said projections being arranged radially about said axis without mutual contact to form a generally conical or domed substantially continuous central dispersion surface, each projection, as a segment of said dispersion surface, and its corresponding conveyer trough being adapted to be subjected to independent vibration to feed product supplied directly onto said segment of the dispersion surface to the corresponding conveyer trough.

2. A dispersion feeder according to claim 1, wherein at least a part of said central dispersion surface is covered with a soft plastic sheet.

* * * * *